United States Patent
Hawkins

(10) Patent No.: US 8,504,555 B2
(45) Date of Patent: Aug. 6, 2013

(54) SEARCH TECHNIQUES FOR RICH INTERNET APPLICATIONS

(75) Inventor: Jonathan C. Hawkins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 542 days.

(21) Appl. No.: 12/145,522

(22) Filed: Jun. 25, 2008

(65) Prior Publication Data

US 2009/0327261 A1    Dec. 31, 2009

(51) Int. Cl.
*G06F 7/00* (2006.01)
*G06F 17/30* (2006.01)

(52) U.S. Cl.
USPC ............... 707/711; 707/742; 707/757

(58) Field of Classification Search
USPC ............ 707/710, 711, 757, 782, 912, 742
See application file for complete search history.

(56) References Cited

U.S. PATENT DOCUMENTS

| | | | |
|---|---|---|---|
| 6,278,992 B1* | 8/2001 | Curtis et al. | 707/711 |
| 7,296,025 B2* | 11/2007 | Kung et al. | 707/608 |
| 7,505,978 B2 | 3/2009 | Bodin et al. | |
| 7,698,316 B2 | 4/2010 | Song et al. | |
| 7,703,040 B2 | 4/2010 | Cutrell et al. | |
| 7,707,152 B1* | 4/2010 | Greenfield et al. | 707/999.1 |
| 2001/0056371 A1 | 12/2001 | Shuster | |
| 2004/0128616 A1* | 7/2004 | Kraft | 715/513 |
| 2005/0097089 A1 | 5/2005 | Nielsen et al. | |
| 2005/0198612 A1 | 9/2005 | Gonzalez | |
| 2006/0184540 A1* | 8/2006 | Kung et al. | 707/10 |
| 2006/0235873 A1 | 10/2006 | Thomas | |
| 2007/0038665 A1* | 2/2007 | Kwak et al. | 707/102 |
| 2007/0043704 A1 | 2/2007 | Raub et al. | |
| 2007/0088686 A1 | 4/2007 | Hurst-Hiller et al. | |
| 2007/0094042 A1 | 4/2007 | Ramer et al. | |
| 2007/0112757 A1* | 5/2007 | Bates et al. | 707/5 |
| 2007/0118609 A1 | 5/2007 | Mullan et al. | |
| 2007/0175674 A1 | 8/2007 | Brinson et al. | |
| 2007/0226242 A1* | 9/2007 | Wang et al. | 707/102 |
| 2007/0271247 A1 | 11/2007 | Best et al. | |
| 2008/0005079 A1 | 1/2008 | Flake et al. | |
| 2008/0071742 A1 | 3/2008 | Yang et al. | |
| 2008/0082513 A1 | 4/2008 | Oral et al. | |
| 2008/0147641 A1 | 6/2008 | Leffingwell et al. | |

(Continued)

FOREIGN PATENT DOCUMENTS

WO    2005/066842 A1    7/2005

OTHER PUBLICATIONS

Ghanem et al. "Databases Deepen the Web". Computer. vol. 37, Issue 1. Jan. 2004. pp. 116-117.*

(Continued)

*Primary Examiner* — James E Richardson

(57) ABSTRACT

A computing device includes one or more rich internet application (RIA) client engines. Each RIA client engine includes a corresponding private RIA storage area. The computing device also includes a per-RIA public storage area for each RIA. The per-RIA public storage area including a subset of data items in the private RIA storage area of the corresponding RIA client engine. A search engine of the computing device may search the data items in the one or more per-RIA public storage areas and link to content in the private RIA storage area of the corresponding RIA client engine at a given data item matching a search request.

20 Claims, 9 Drawing Sheets

U.S. PATENT DOCUMENTS

| | | | |
|---|---|---|---|
| 2008/0147655 A1* | 6/2008 | Sinha et al. | 707/6 |
| 2008/0229231 A1 | 9/2008 | Delia et al. | |
| 2009/0063421 A1* | 3/2009 | Burson et al. | 707/3 |
| 2009/0063448 A1 | 3/2009 | DePue et al. | |
| 2009/0248619 A1 | 10/2009 | Das et al. | |
| 2009/0265367 A1* | 10/2009 | Corbett | 707/102 |
| 2009/0327261 A1 | 12/2009 | Hawkins | |
| 2009/0327270 A1 | 12/2009 | Teevan et al. | |
| 2010/0205208 A1 | 8/2010 | Walker | |
| 2011/0066951 A1 | 3/2011 | Ward-Karet et al. | |
| 2011/0093434 A1 | 4/2011 | Arora et al. | |

OTHER PUBLICATIONS

Carughi, Giovanni Toffetti, "Modeling data-Intensive Rich Internet Applications with server push support", conf/icwe/2007mdwe, vol. 261, Year 2007, 15 pages.

Duhl, Joshua, "Rich Internet Applications", Nov. 2003, 33 pages.

Heller, David, "RIAs: The Technology Is Exciting, but They Really Do Help Users", Dec. 6, 2005, 13 pages http://www.uxmatters.com/MT/archives/000041.php.

"The revolution for interacting with the Web" http://www.softguide.com/pj/2836/flex.htm.

"Google Desktop" http://desktop.google.com/features.html#additional.

"Welcom to Google Enterprise", Retrieved at <<http://www.google.com/enterprise/enterprise_solutions/eduation.html>>, Retrieved Date: Oct. 19, 2011, 2 pages.

International Search Report and Written Opinion received for PCT Patent Application No. PCT/US2012/069979, mailed on Apr. 5, 2013, 10 pages.

* cited by examiner

SEARCH TECHNIQUES FOR RICH INTERNET APPLICATIONS

BACKGROUND

Computing devices have made significant contributions toward the advancement of modern society and are utilized in a number of applications to achieve advantageous results. Computing devices have facilitated increased productivity and reduced costs in communicating and analyzing data in most areas of entertainment, education, business, and science. The amount of information accessible through computing devices continues to increase. There are a number of techniques for locating information depending upon where the data is located. Generally, search engines are information retrieval systems used to locate content, information, data and the like on computing systems. Internet search engines enable searching of publicly accessible information on the World Wide Web, but not application data that is private to a user. Desktop search engines enable searching the local system for user specific information.

Referring now to FIG. 1, a computing environment according to the conventional art is shown. The computing environment 100 includes one or more applications that run locally on a user computing device (e.g., desktop applications) 110-130, local storage 140 for storing data for use by the applications, and a search engine 150-170. The search engine's crawler 150 collects metadata about each item of content in the local storage 140 and indexes 160 the content based on the metadata. The search index 160 may then be queried by the query routine 170 of the search engine 150-170 to find one or more data items that match the search query. The matching data items are displayed to the user as search results. The user may select a given data item in the search results to deeply link to the data in a corresponding application.

In addition to content and application that run locally on a user computing device, there are a growing number of rich internet applications. The rich internet applications are applications with features and functionality similar to desktop applications. At least a portion of each rich internet application runs locally in a secure environment (e.g., sandbox) and a portion may also run on a server. The content and application data of a rich internet application is stored in a private storage area of the rich internet application and is not generally available outside the rich internet application. Therefore, the content of rich internet applications and application data is not readily searchable by the desktop search engine. Accordingly, there is a need for search techniques that provide for searching the content of rich internet applications.

SUMMARY

Embodiments of the present technology are directed toward search techniques for rich internet applications. In one embodiment a method for enabling searching rich internet applications includes publishing a subset of private rich internet application data to a corresponding per-rich internet application public storage area for each of one or more rich internet applications, and a relative link to one or more given items of the subset in the private rich internet application data. The method also includes generating a search index of data stored in the per-rich internet application public storage area. The method may also include receiving a search request, querying the search index based on the search request, and outputting a search result of the query. The method may further include receiving a selection of a given item of the search result, starting a given rich internet application based on the selected given item, and passing the relative link for the given item to the rich internet application. In response thereto, the rich internet application converts the relative link to a qualified link and outputs content at the given item through the rich internet application.

In another embodiment, one or more computing device readable media including instructions which when executed cause a computing system to implement a method that includes publishing a subset of data and relative link thereto in a public rich internet application storage and notifying a search engine of the publication of the subset of data and relative links. In response thereto, the search engine analyzes the subset of data published to each per-rich internet application public storage to build an encoded index based on a system of weighting and stores the encoded index in a search index.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Figure 2:
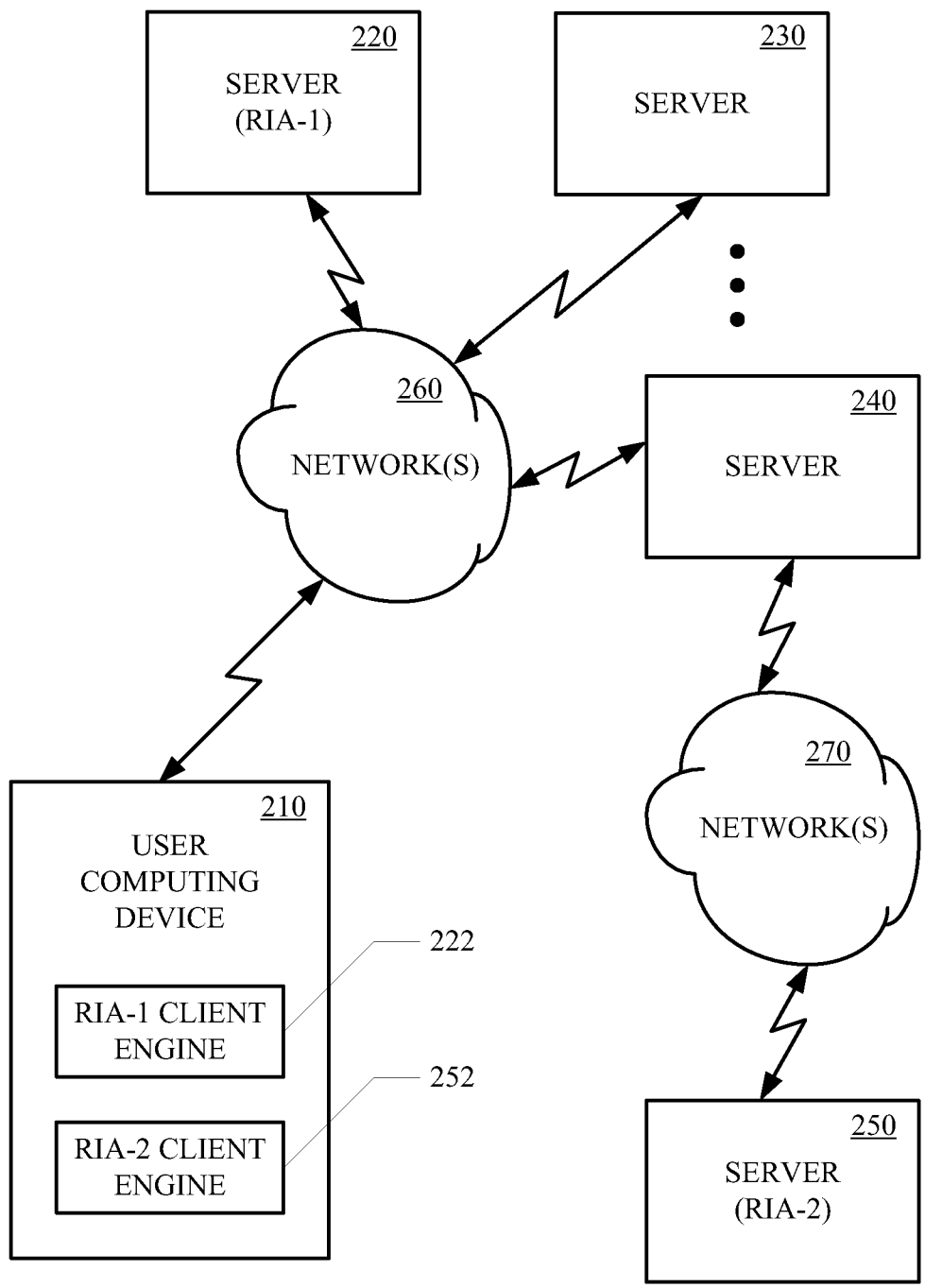
FIG. 2 shows a block diagram of an exemplary computing system for implementing embodiments of the present technology.

FIG. 2 shows an exemplary computing system for implementing embodiments of the present technology. The computing system 200 includes a user computing device 210 communicatively coupled to one or more server computing devices 220, 230, 240, 250 by one or more networks 260, 270. One or more of the servers 220, 250 provide one or more rich internet applications to the user computing device 210. The rich internet applications are applications with features and functionality similar to desktop applications. At least a portion of each rich internet application runs locally on the user computing device 210 referred to as client engines 222, 252, and a portion may also run on a corresponding server 220, 250. The rich internet applications may include, but are not limited to, a travel application, a podcast application, a conference session schedule, an audio/video equipment reservation application, a business expense report application, a tax preparation application, a purchasing application, and the like.

Figure 3:
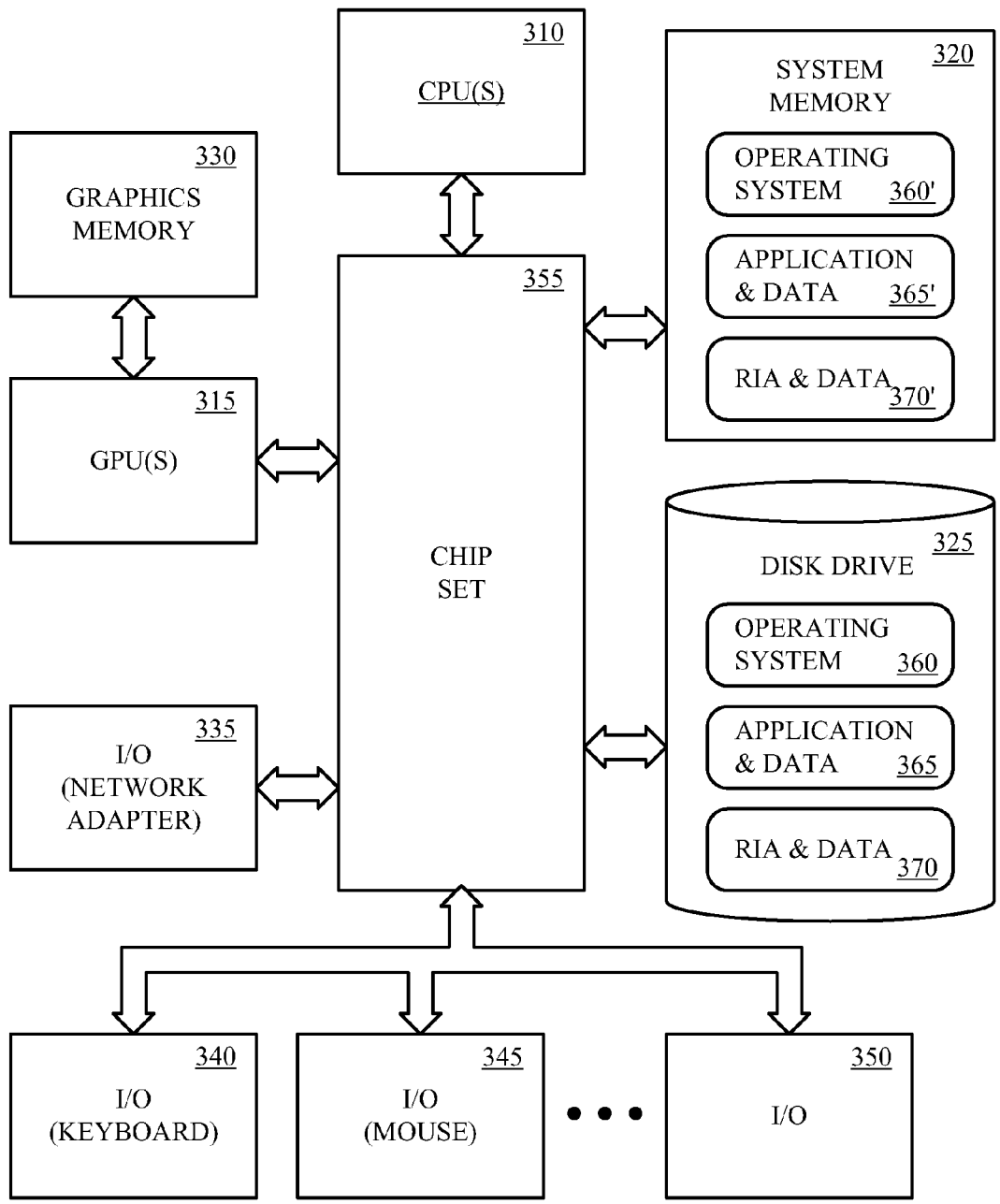
FIG. 3 shows a block diagram of an exemplary user computing device, in accordance with one embodiment of the present technology.

Referring now to FIG. 3, an exemplary user computing device, in accordance with one embodiment of the present technology, is shown. The exemplary user computing device 210 may be a desktop personal computer (PC), laptop computer, personal digital assistant (PDA), smart phone, netbook personal computer, ultra-mobile personal computer (UMPC), mobile internet device (MID), ebook, or the like. The user computing device 210 includes one or more processors (e.g., CPU, GPU) 310, 315, one or more computing device-readable media 320-330 and one or more input/output (I/O) devices 335-350. The processors 310, 315, computing device-readable media 320-330 and I/O device are typically communicatively coupled to each other by a chip set 355 and/or one or more busses. The chipset 355 acts as a simple input/output hub for communicating data and instructions between the processors 310, 315, the computing device-readable media 320-330, and the I/O devices 335-350.

The I/O devices 335-350 include a network adapter (e.g., Ethernet card) 335 for communicating with one or more server computers over one or more networks. The I/O devices 335-350 also include a CD drive, DVD drive and/or the like, and peripherals such as a keyboard 340, a pointing device 345, a speaker, a printer, and/or the like.

The computing device-readable media 320-330 may be characterized as primary memory and secondary memory. Generally, the secondary memory, such as a magnetic and/or optical storage, provides for non-volatile storage of computer-readable instructions and data for use by the computing device 200. For instance, the disk drive 325 may store the operating system (OS) 360, desktop applications and data 365, and one or more rich internet applications (e.g., client engines) and data 370. The primary memory, such as the system memory 320 and/or graphics memory 330, provides for volatile storage of computer-readable instructions and data for use by the computing device 200. For instance, the system memory 320 may temporarily store a portion of the operating system 360', a portion of one or more applications and associated data 365' and a portion of one or more rich internet application and associated data 370' that are currently used by the CPU 310, GPU 315 and the like.

Figure 1:
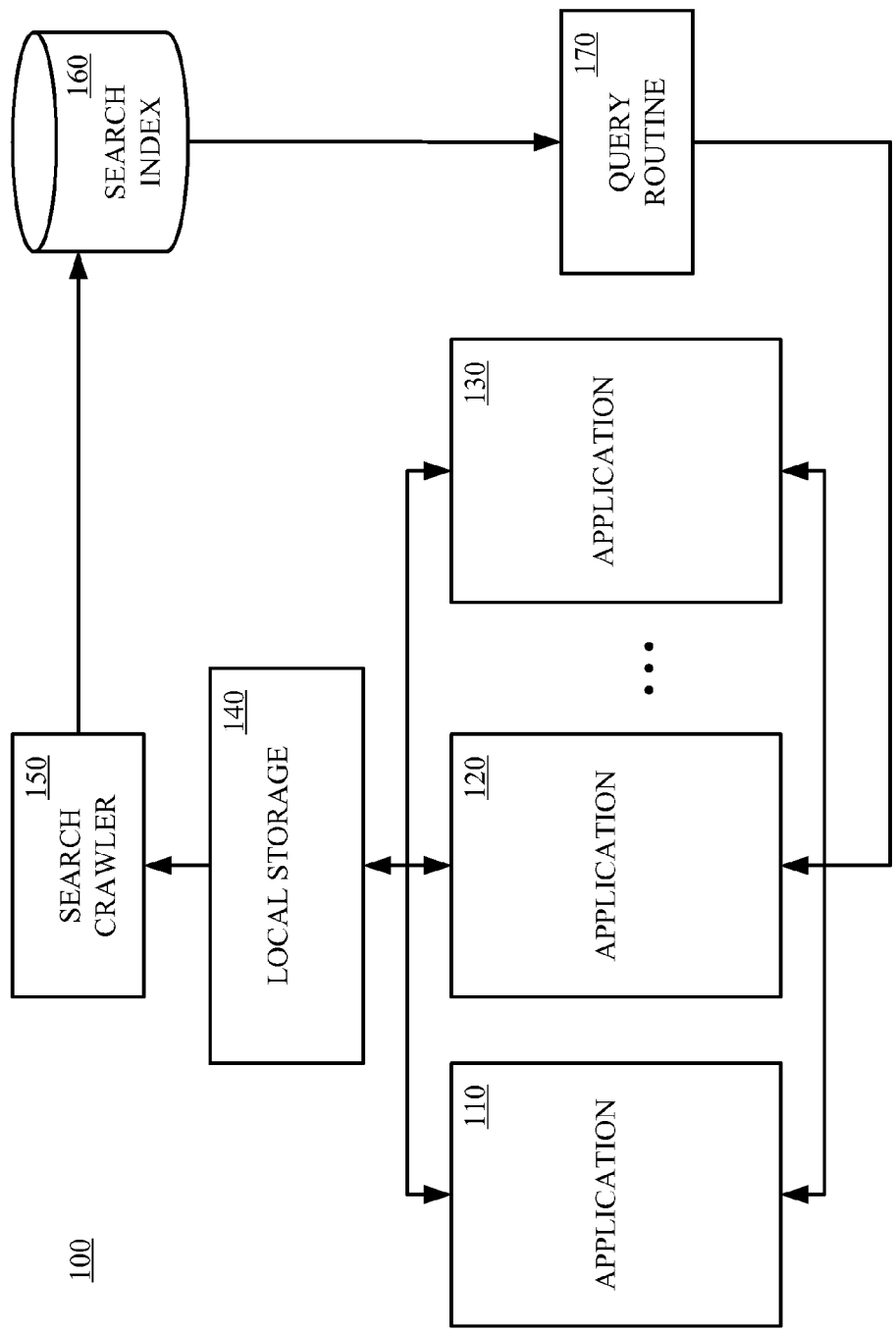
FIG. 1 shows a block diagram of a computing environment according to the conventional art.
Figure 4:
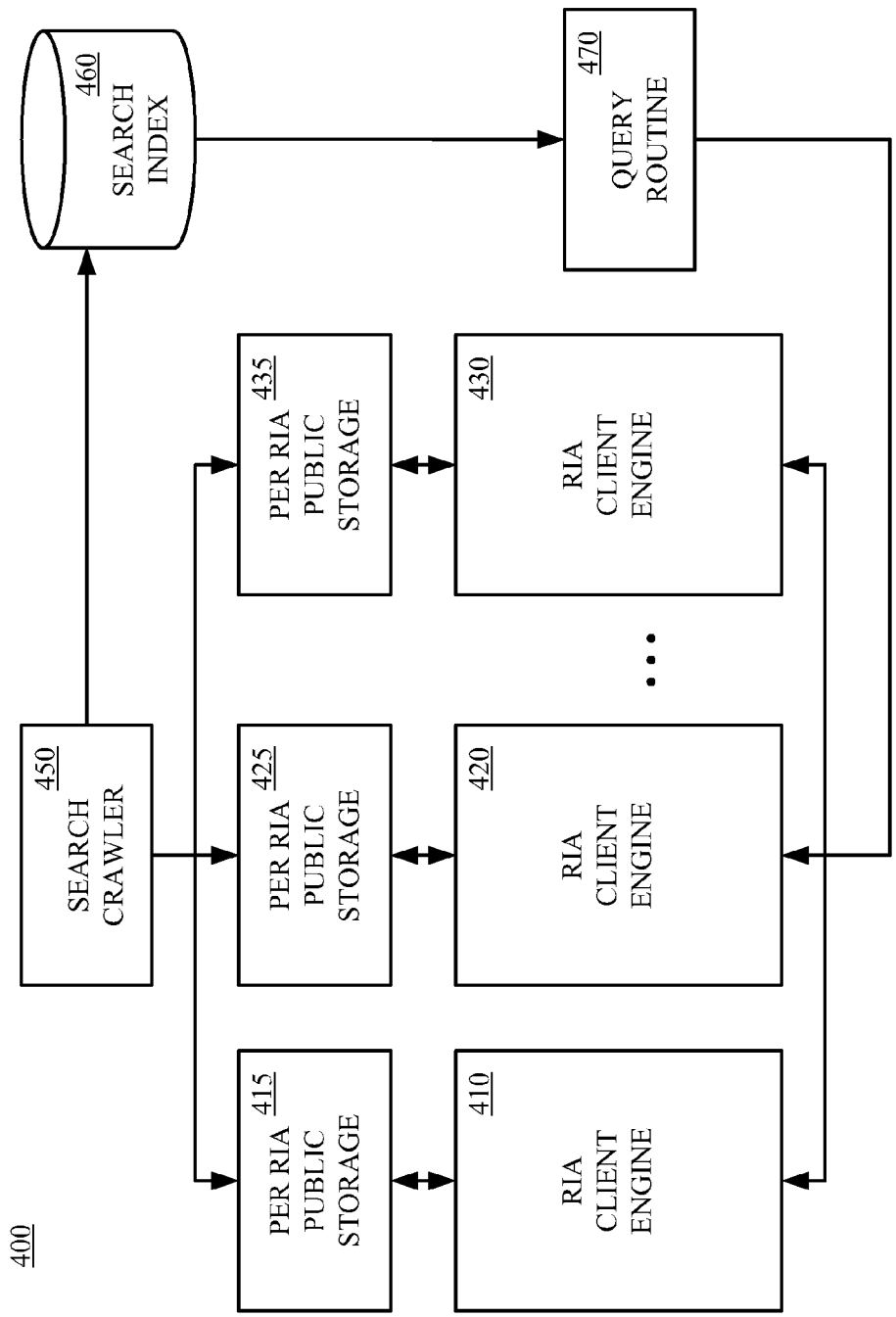
FIG. 4 shows a block diagram of a computing environment, in accordance with one embodiment of the present technology.

Referring now to FIG. 4, a computing environment, in accordance with one embodiment of the present technology, is shown. The computing environment 400 includes one or more rich internet application client engines 410, 420, 430 and a search engine 450-470. The computing environment may also include one or more desktop applications as illustrated in FIG. 1. The search engine 450-470 includes a search crawler 450, a search index 460, and a query routine 470. At least a portion of each rich internet application runs locally in a secure environment (e.g., sandbox), and a portion may also run on a server. In particular, rich internet applications introduce an intermediate layer of code, often called a client engine 410, 420, 430, between the user machine and the server. The client engine is usually downloaded at the beginning of the application, and may be supplemented by further code downloads as the application progresses. The client engine is programmed to perform application functions that will enhance some aspect of the user experience, such as the user interface, responsiveness when handling certain user interactions, personalizing data, information, content and the like to the given user, and/or the like. Rich internet applications may also generally be referred to as rich clients, rich web clients, or rich web applications.

A subset of each rich internet application's data, personal to a user, is made available to a respective per-RIA public data storage 415, 425, 435 so that it can be integrated with the rest of the local user data. The subset of each rich internet application's data is made available outside of the rich internet application in the sense that it is available to other applications or systems like the local search engine 450-470. The public data storage areas 415, 425, 435 for the respective rich internet applications enable each application to integrate a subset of its private application data into the local machine for an integrated user experience. The public rich internet application data can be used in platform experiences, like desktop search, or application experience for manipulation by other applications, such as a spreadsheet application.

Figure 5:
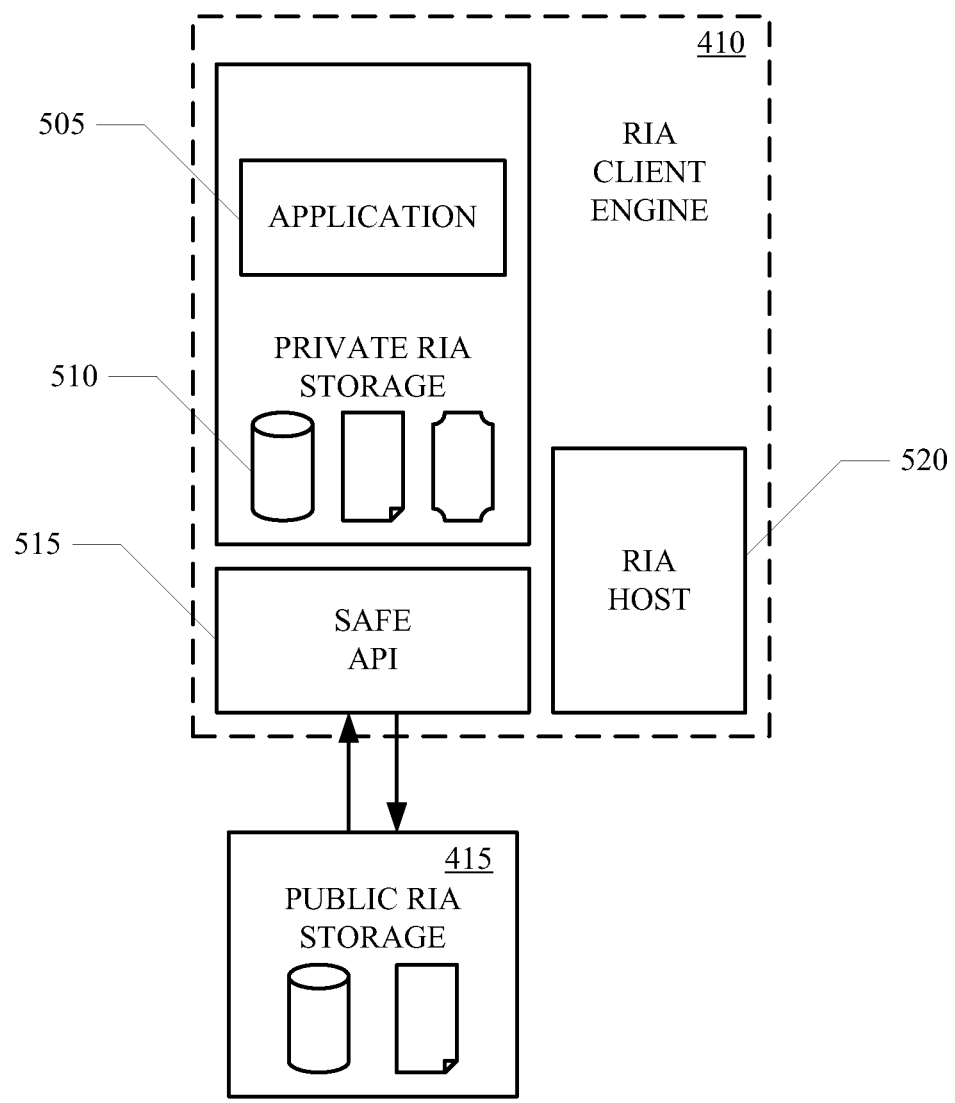
FIG. 5 shows a block diagram of a rich internet application client engine, in accordance with one embodiment of the present technology.

Referring now to FIG. 5, each rich internet application client engine 410, 420, 430, in accordance with one embodiment of the present technology, includes a local portion of an application 505, private RIA storage 510, a safe application programming interface (API) 515 and a RIA host 520. The application 505 stores data that is private to the respective user locally in the private RIA storage 510 (e.g., the rich internet application is sandboxed). The data stored locally may be downloaded from one or more networks or may be input locally on the user computing device 210. A subset of the application's data may be published to the public RIA storage area 415. In particular, each rich internet application client engine 410 can publish data items through the safe API 515 into its own specific public data storage area 415. The RIA host 520 manages the rich internet application identity and sandboxing. In particular, the RIA host 520 provides for deeply linking from search results generated by the query routine 470 to data in the private RIA storage 510 based on the public RIA storage data 415.

Figure 6A:
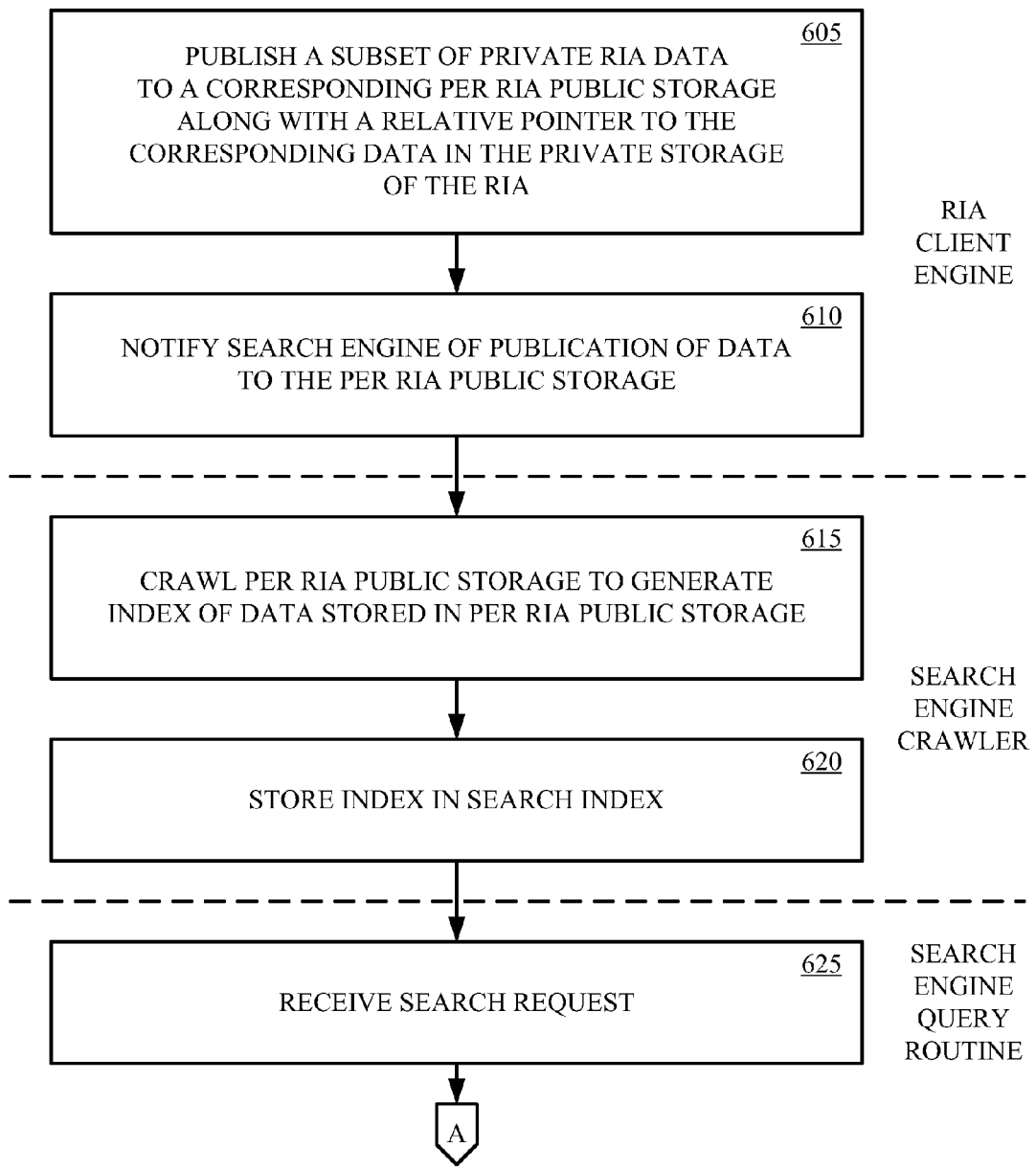
FIGS. 6A-6C show a flow diagram of a method for searching rich internet application data, in accordance with one embodiment of the present technology.
Figure 6B:
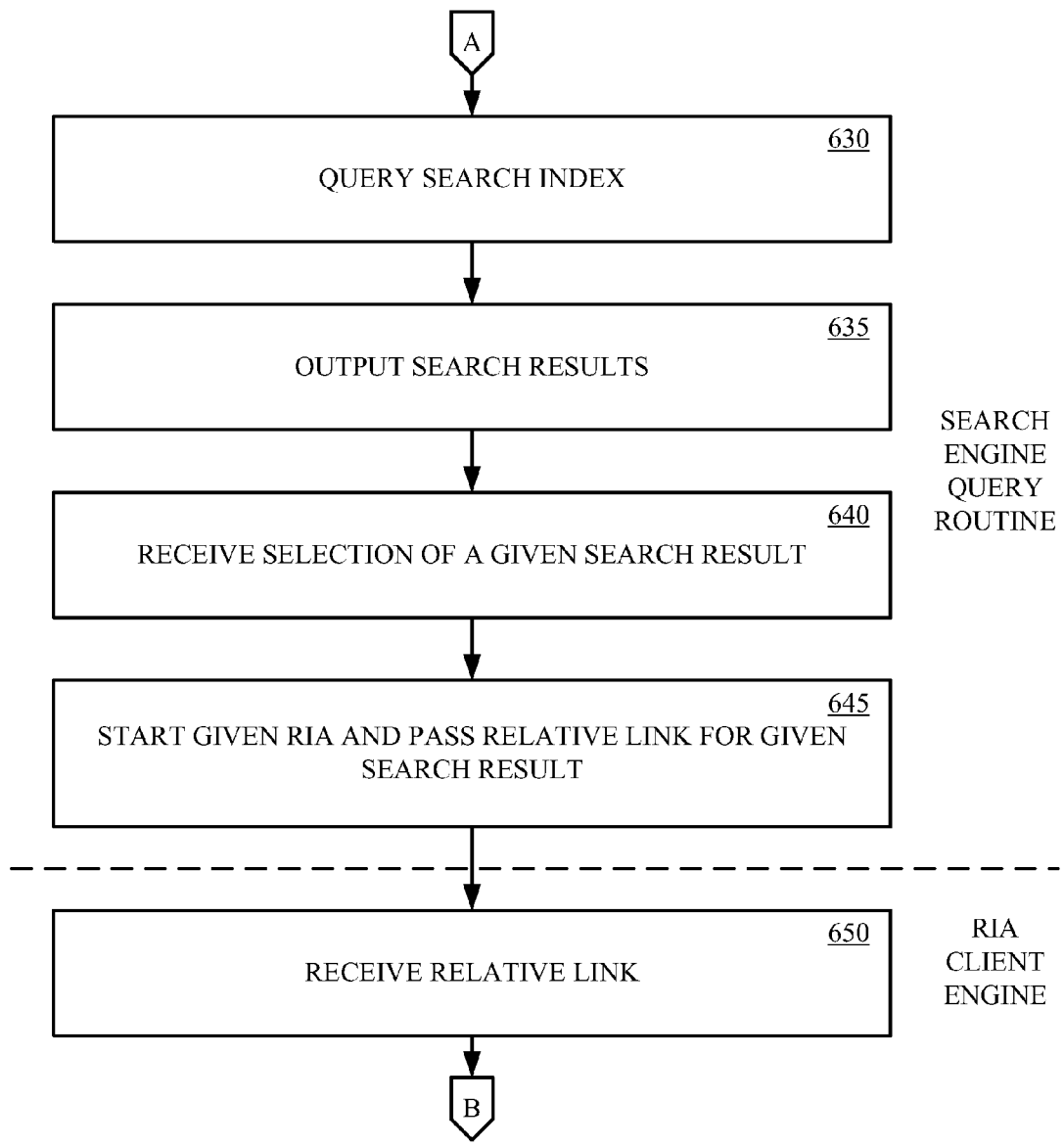
Figure 6C:
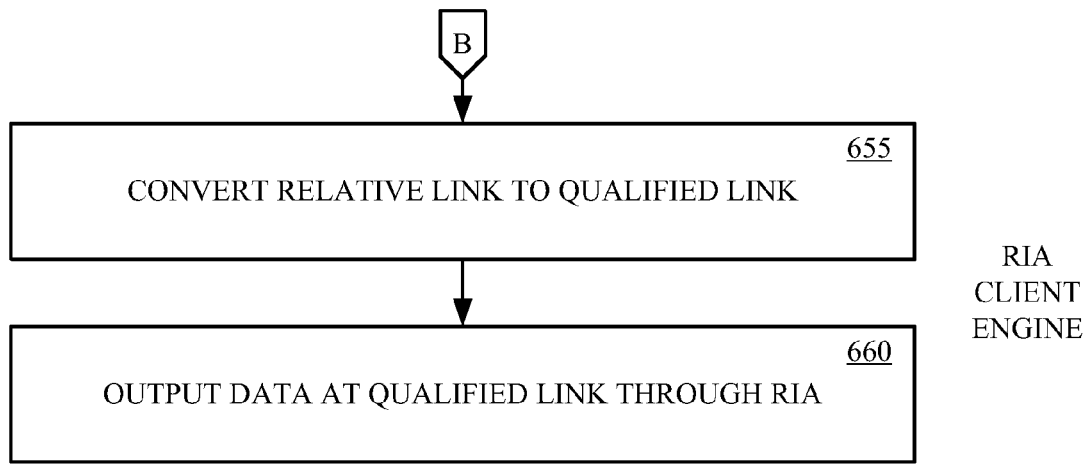

Operation of the computing environment shown in FIGS. 4 and 5 will be further explained with reference to FIGS. 6A-6C, which show a method for searching rich internet application data. At 605, the rich internet application client engine 410 publishes a subset of the private RIA data 510 to a corresponding per RIA public storage 415 along with a relative link to the corresponding data in the private storage 510 of the rich internet application. In one implementation, a safe API 515 of the rich internet application client engine 410 publishes a subset of the given rich internet application's data stored in the private RIA storage 510 to a public RIA storage 415 associated with the given rich internet application. The safe API 515 also generates a relative path corresponding to the fully qualified path (e.g., URL) of the location in the private RIA storage 510 of each item for the subset of data. At 610, the rich internet application may also notify the search engine of the publication of data to the rich internet application's corresponding public RIA storage 415. In one implementation, the safe API 515 of the rich internet application client engine 410 may notify the search crawler 450 that data has been published by the rich internet application to its corresponding public RIA storage 415

In one implementation, the developer of a rich internet application chooses which data items to publish into the RIA public data storage area 415, 425, 435, as search items. For the search items the developer may provide a title, one or more keywords, an optional FormName, and a safe relative navigation uniform resource locator (e.g., ID=25) within the rich internet application. For example, the following pseudo code illustrates publishing of exemplary search item data:

```
// Publish search item to public data
{
    PublicData.PublishSearchItem(
        Title,                    // Butterfly
        Keywords,                 // Skipper Butterfly
        FormName,                 // "Page.xaml"
        RelativeNavigationLink    // "ID=" + ItemID
    );
}
```

In addition to manually publishing data items for search indexing, the rich internet application developer can automatically publish items from the rich internet application data model. The developer may define the rich internet application data model using classes to describe the data entities and relationships between them. For example a purchasing rich internet application may have Order and a collection of OrderLine that work together to represent a complete purchase order. The private data mode is stored in per-rich internet application private storage. The private data model may be specified for example by the following pseudo code:

```
public class Order {
    public String ShipCity {get}
    public Customer Customer {get}
    public String ShipCity {get}
    public List<OrderLine> Orderlines {get}
}
public class Customer
{
    public String Name {get;set;}
}
public class OrderLine{
//...
}
```

The developer may enable searching of the rich internet application's object data model by identifying and marking the items in the object data model (views into the data model) that are search items and the parts of search meta data such as search title, search keyword, etc. The developer may use custom attributes on the class members to mark the items. When the data model is loaded into the rich internet application by the data system, the data system works with the rich internet application search integrator to automatically publish the marked data items to the search index. For example, the following pseudo code illustrates:

```
[SearchItem]
public class Order {
    [SearchIdentifier]
    public string ID {get}
    [SearchTitle("Customer.Name")]
    [SearchKeywordSource]
    public Customer Customer {get}
    [SearchKeywordSource]
    public String ShipCity {get}
    public List<OrderLine> OrderLines {get}
}
public class Customer
{
    public String Name {get;set;}
}
public class OrderLine {
//...
}
``` wherein, the SearchItem identifies that the item from the object data model should be included in the search index. SearchIdentifier is a unique identifier for the item for the search index to enable tracking and provides to the application the ability to navigate back to the item when the user clicks on a search result. SearchTitle is the tile of the item to display in the search results. SearchKeywordSource are keywords from the item that will be included in the search index to enable users to search the index to find search results.

At 615, the search crawler 450, sometimes also referred to as a spider, analyzes the subset of data published to the public RIA storage 415, 425, 435 of each rich internet application to build an index of the data. The analysis generally builds list of words found in the files on the public RIA storage 415, 425, 435 and the metadata for those files and where the words were found. The search crawler 450 builds an index based on a system of weighting (e.g., ranking). The weighting, for example, might assign a weight to each entry with increasing values assigned to words as they appear near the top of a document, in sub-headings, in links, in the meta tags or in the title of the page. The index may be encoded to reduce the storage requirements and/or time to search the index. The search crawler 450 may also index the local storage 140 of the desktop applications 110-130, as illustrated in FIG. 1. In one implementation, a search crawler 450, such as in Windows Desktop Search or Google Desktop Search, indexes the data in each of the per-RIA public storage 415, 425, 435. The public RIA data storage area 415, 425, 435, may be automatically indexed by the search crawler 450 as part of the user's regular "User's Profile" or "Documents" area.

The encoded index is then stored in a search index 460, at 620. If the search crawler 450 indexes items in the local storage 140, the indexed items from the local storage 140 may be combined with the indexed items from the per RIA public storages 415, 425, 435, in a single search index or a separate search index may be maintained for items in the local storage 140. The processes of 605-620 may be performed periodically, in response to a change of the data in a private RIA storage area 510, or in response to receipt of a search request just before the search index is queried.

At 625, the query routine 470 receives a search request. The search request may be a simple text search, literal search, concept-based search, advanced query search, natural query search or the like. In one implementation, the query routine 470 provides a graphical user interface including a text field to enter the search request. The query routine 470 examines the search index 460 and determines the one or more applicable search results, at 630. The search results include a listing of best-matching data according to a specified criteria. At 635, the query routine outputs the search results. The search results may include, but is not limited to, the name of the item (e.g., file), the name of the rich internet application, date/time created, date/time modified, item size, item type, a summary of the item and/or the like for each item in the per RIA public storages that matches the search request as determined from the search index. The search results may also include the name of the item (e.g., file name), path, the name of the application, date/time created, date/time modified, item size, item type, a summary of the item and/or the like for each time in the local storage 140 that matches the search request as determined from the search index.

At 640, selection of a given item in the search result is received. In one implementation, the user may select the given item in the search results displayed in the graphical user interface using a pointing device, a keyboard or the like. At 645, the query routine 470 starts a given rich internet application that the selected item is associated with and passes a relative link for the given search result item to the rich internet application. The user may also or alternatively specify a given application to start that can access the selected item in the private RIA storage.

At 650, the rich internet application receives the relative link. At 655, the relative link is converted to a qualified link to the selected item in the search result in the private RIA storage. In one instance, the developer can provide code in the RIA host 520 to process a relative navigation uniform resource locator (URL) to enable deep navigation to the corresponding fully qualified uniform resource locator (URL) when the rich internet application starts. The code in the RIA host 520 can process the relative navigation uniform resource locator and query string when the rich internet application starts. For example, the following pseudo code illustrates navigation upon startup of the rich internet application based on the relative navigation uniform resource locator:

```
// Process navigation RIA start up
public partial Class Page : UserControl
{
    void Page_Loaded(object sender,
    System.Windows.RoutedEventArgs e)
    {
        //Process navigation link
        String itemID = this.QueryString["ID"];
        //Show Page with itemID
    }
}
```

The RIA application programming interface interacts with the RIA host to safely expand the relative URL to a full navigation URL. Thus the rich internet application developer provides a navigation entry point to enable automatic deep linking. Thereafter, when the user searches for an item in the search index and clicks on a search result, the search systems will work with the RIA host to launch the rich internet application and navigate into the application with specific data (e.g., to a particular purchase order) For example, the following pseudo code illustrates deep linking:

```
public class OrderPage: Page
{
    [SearchNavigationAction]
    Public void DisplayOrder(String ID) {
    //...
    }
}
```

At 660, the content at the qualified link in the private storage of the rich internet application is output through the rich internet application. The data may be output within the rich internet application or may be output for use by another application.

Figure 7:
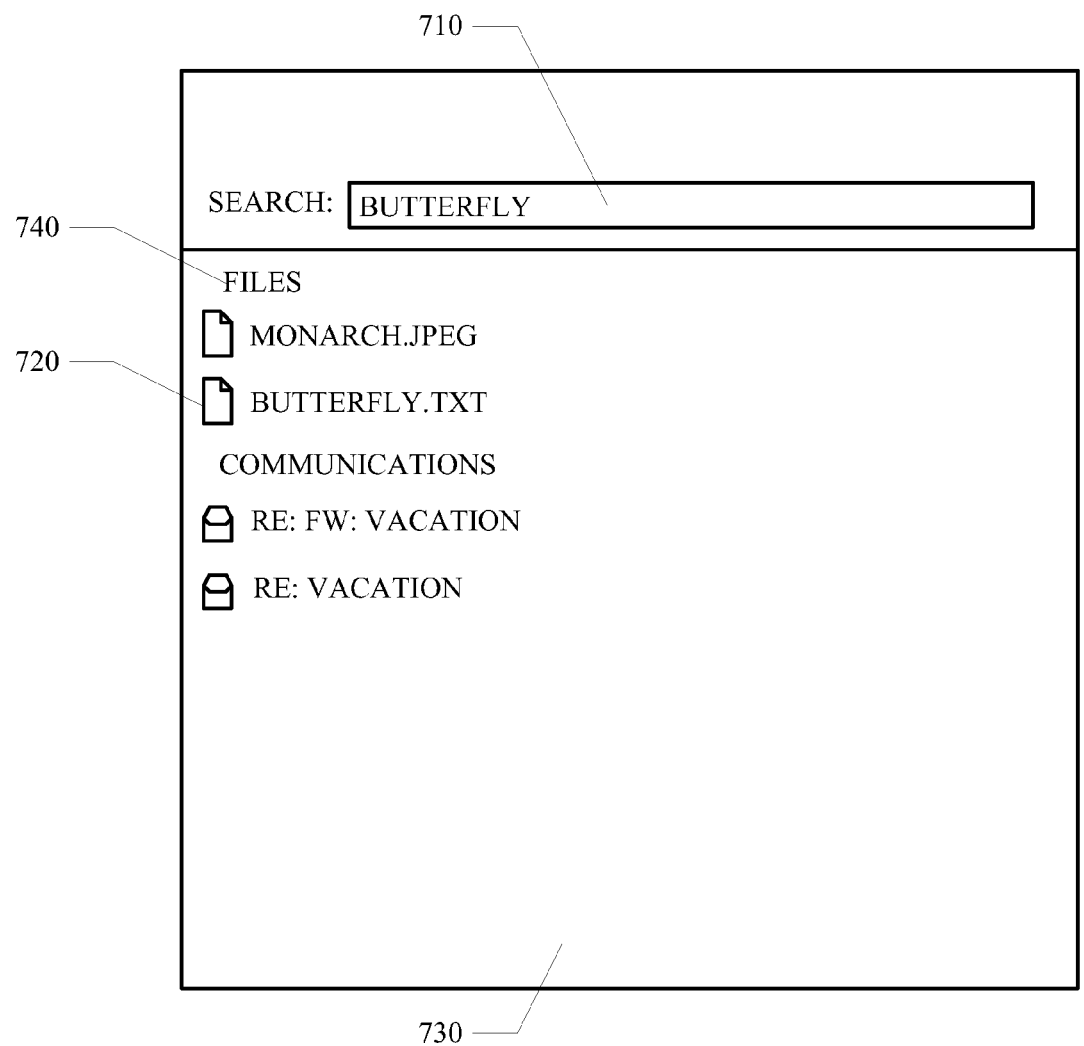
FIG. 7 shows a block diagram of an exemplary graphical user interface of a search engine, in accordance with one embodiment of the present technology.

Referring now to FIG. 7, an exemplary graphical user interface (GUI) provide by the query routine of a search engine, in accordance with one embodiment of the present technology, is shown. A user may type in one or more keywords into a query field 710 to find matching data items and files across all rich internet application. The query may also find matching data items and files across the local file system, personal profile and local application data (e.g., Outlook). The matching data items and files 720 are shown to the user as a list of search results in a results field 730 of the GUI 700. The user can click on a given item in the search results to deeply navigate into the given rich internet application with specific form for the data item. For example, the user may type in "Butterfly" to which multiple matches are returned as the search results. The user can refine the search with additional keywords to isolate the particular data item that they are looking for.

The search results may be aggregated 740 based upon one or more parameters such as the file type, storage location, date created/modified, or the like. For example, when the user searches from within a rich internet application they will see an aggregate set of results including published data items from the current rich internet application, search results from their local data, published data items from other local rich internet application, and optionally from their enterprise search engine and/or internet search engines.

Accordingly, embodiments of the present technology advantageously publish specified data items to a per-rich internet application data storage areas. The data items may be automatically published for search indexing from a specified application data model. The systems search engine may therefore search data items of rich internet applications. In addition, users may deeply link from search results to the selected data item in the given rich internet application.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the Claims appended hereto and their equivalents.

What is claimed is:

1. A method for searching content stored on a local computing device of a user, the method comprising:
publishing at least some of the content as one or more subsets of private rich internet application data, personal to the user, to a corresponding one or more respective per-rich internet application public storage areas, each of the one or more subsets of private rich internet application data corresponding to a respective rich internet application having at least a portion installed locally on the local computing device, each of the one or more subsets of private rich internet application data being stored in a respective private rich internet application storage area that is not accessible outside the respective rich internet application, the published one or more subsets of private rich internet application data being stored on and publically available for access on the local computing device;

publishing a relative link to one or more given items of at least one of the one or more subsets in the private rich internet application data;

notifying a search engine of the publication of the one or more subsets of private rich internet application data and the relative link to the one or more given items; and in response to the notification, crawling the one or more per-rich internet application public storage areas, and generating and storing on the local computing device by a local search engine executing on the local computing device, a search index of data, including the published one or more subsets of private rich internet application data and the relative link to the one or more given items.

2. The method according to claim 1, further comprising: receiving a search request;
querying the search index based on the search request; and outputting a search result of the query.

3. The method according to claim 2, further comprising: receiving a selection of a given item of the search result;
starting a given rich internet application based on the selected given item;
passing the relative link for the given item to the given rich internet application;
converting the relative link to a qualified link; and
outputting content at the given item through the given rich internet application.

4. The method according to claim 3, wherein the qualified link comprises a uniform resource locator (URL).

5. The method according to claim 1, wherein the search index is further generated for data stored in a local storage area.

6. The method according to claim 1, wherein at least a portion of each of the respective rich internet applications executes on the local computing device and a portion executes on a server computing device.

7. The method according to claim 1, further comprising: defining a rich internet application data model; and
automatically publishing the one or more subsets of private rich internet application data using the rich internet application data model.

8. The method according to claim 7, further comprising: describing one or more data entities and relationships between the data entities using one or more classes that are included in the rich internet application data model.

9. One or more computing device readable storage memories including instructions which when executed cause a computing system to implement a search method for searching content stored on a local computing device comprising:

publishing at least some of the content as one or more subsets of data, personal to a user, to a corresponding one or more respective per-rich internet application public storage areas, each of the one or more subsets of data corresponding to a respective rich internet application having at least a portion installed locally on the local computing device, each of the one or more subsets of data being stored in a respective private rich internet application storage area that is not accessible outside the respective rich internet application, the published one or more subsets of data being stored on and publically available for access on the local computing device;

publishing a relative link to each data item in the one or more subsets of data;

notifying a search engine of the publication of the one or more subsets of data and each relative link;

analyzing the one or more subsets of data published in the one or more respective per-rich internet application public storage areas to build an encoded index based on a system of weighting; and in response to the notification, crawling the one or more per-rich internet application public storage areas, and generating and storing the encoded index in a search index by a local search engine executing on the local computing device, the search index including the published one or more subsets of data and each relative link.

10. The one or more computing device readable storage memories according to claim 9, further comprising:
receiving a search request;
analyzing the search index to determine one or more data items in the one or more per-rich internet application public storage areas that match the search request and the relative link of the one or more data items;
displaying to the user the one or more data items as a search result.

11. The one or more computing device readable storage memories according to claim 10, further comprising:
receiving selection of a given data item in the search result;
starting a given rich internet application; and
passing a given relative link corresponding to the given data item to the given rich internet application.

12. The one or more computing device readable storage memories according to claim 11, further comprising:
converting the given relative link to a qualified link for the give data item in a private per-rich internet application storage area of the given rich internet application; and
outputting content in the private per-rich internet application storage at the given data item through the given rich internet application.

13. The one or more computing device readable storage memories according to claim 12, wherein the qualified link comprises a qualified uniform resource locator (URL).

14. The one or more computing device readable storage memories according to claim 12, wherein the data items of the search result are aggregated based on one or more parameters.

15. The one or more computing device readable storage memories according to claim 9, further comprising:
defining a rich internet application data model; and
automatically publishing the one or more subsets of data using the rich internet application data model.

16. A system comprising:
one or more processors;
one or more rich internet application client engines including one or more respective private rich internet application storage areas, at least a portion of each of the one or more rich internet application client engines installed locally on a local computing device;
one or more per-rich internet application public storage areas that correspond to one or more respective rich internet applications, the one or more per-rich internet application public storage areas including one or more respective subsets of data items, personal to a user, that are stored in the one or more respective private rich internet application storage areas that are not accessible outside the corresponding one or more respective rich internet application client engines, the one or more subsets of data items being stored on and publically available for access on the local computing device, each of the one or more per-rich internet application public storage areas further including a relative link to one or more given items of the respective subset of items; and
a search engine, at least partially implemented using at least one of the one or more processors, for searching the data items in the one or more per-rich internet application public storage areas and linking to content in a given private rich internet application storage area of a corresponding rich internet application client engine at a given data item matching a search request, the search engine configured to be notified of a publication of the one or more subsets of data items and each relative link, the search engine further configured to crawl the one or more per-rich internet application public storage areas and to generate and store on the local computing device a search index that includes the one or more subsets of data items and each relative link in response to a notification of a publication of the one or more subsets of data items and each relative link.

17. The system according to claim 16, wherein each rich internet application client engine further includes a safe application programming interface (API) for publishing the one or more subset of data items in the one or more respective private rich internet application storage areas to the one or more respective per-rich internet public storage areas along with one or more relative links to the data items of the one or more subsets in the one or more respective per-rich internet application private storage area.

18. The system according to claim 17, wherein each rich internet application client engine further includes a rich internet application host for receiving a given relative link, translating the relative link to a qualified link and outputting the content at the qualified link through a given rich internet application.

19. The system according to claim 18, wherein the qualified link comprises a uniform resource locator (URL).

20. The system according to claim 18, wherein the search engine comprises a desktop search engine.

\* \* \* \* \*